US008768989B2

(12) United States Patent
Yeung et al.

(10) Patent No.: US 8,768,989 B2
(45) Date of Patent: Jul. 1, 2014

(54) FUNNEL SHIFTER IMPLEMENTATION

(75) Inventors: Raymond C. Yeung, Round Rock, TX (US); Lincoln R. Nunes, Austin, TX (US); Geoffrey F. Oh, Austin, TX (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 13/164,235

(22) Filed: Jun. 20, 2011

(65) Prior Publication Data

US 2012/0239717 A1 Sep. 20, 2012

Related U.S. Application Data

(60) Provisional application No. 61/454,274, filed on Mar. 18, 2011.

(51) Int. Cl.
*G06F 15/00* (2006.01)
(52) U.S. Cl.
USPC .......................................... 708/209
(58) Field of Classification Search
CPC ....... G06F 5/015; G06F 5/01; G06F 9/30032; G06F 9/30036; G06F 7/762
USPC .......................................... 708/209
See application file for complete search history.

(56) References Cited

U.S. PATENT DOCUMENTS

| | | | |
|---|---|---|---|
| 4,488,252 A * | 12/1984 | Vassar ............................ | 708/209 |
| 4,931,974 A | 6/1990 | Ngoc et al. | |
| 5,790,444 A * | 8/1998 | Olson et al. .................... | 708/209 |
| 5,896,305 A * | 4/1999 | Bosshart et al. ............... | 708/209 |
| 6,324,239 B1 | 11/2001 | Potter et al. | |
| 7,409,415 B2 | 8/2008 | Bosshart | |
| 2007/0088772 A1* | 4/2007 | Nunes et al. ................... | 708/209 |

OTHER PUBLICATIONS

Steven Huntzicker, et al., "Energy-Delay Tradeoffs in 32-bit Static Shifter Designs," Sun Microsystems Laboratories, 2008, 7 pages.

* cited by examiner

*Primary Examiner* — Tan V. Mai
(74) *Attorney, Agent, or Firm* — Stephen J. Curran; Meyertons, Hood, Kivlin, Kowert & Goetzel, P.C.

(57) ABSTRACT

A funnel shifter includes an input, an output, and a multiplexer unit including a number of multiplexer levels. The multiplexer unit may perform one of a plurality of shift operations on an input value and to provide an output value in response to receiving a shift value and a shift operation value. A first multiplexer level may be configured to format and expand the input value into a larger intermediate value. At least a second multiplexer level may be configured to perform a linear shift of the intermediate value without wrapping any bits for creating the output value. At least some of the multiplexer levels may include multiplexer select signals that may be represented as a plurality of N-Nary one of N signals where N is greater than or equal to two, wherein each of the plurality of N-Nary signals being implemented on a set of physical wires.

23 Claims, 6 Drawing Sheets

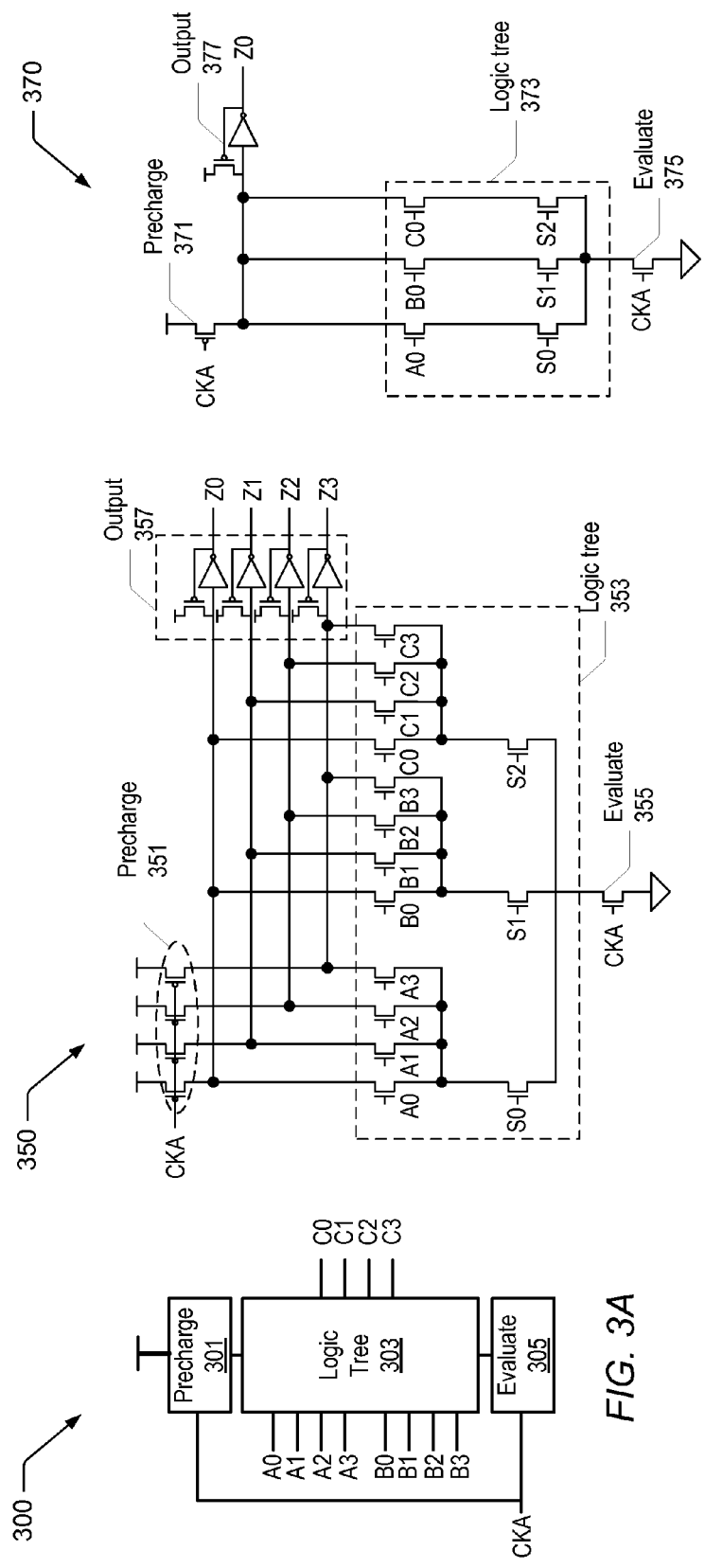

Funnel Shifter Bit Wiring (Level 1)

| Shift type | | Bit: 62 61 60 59 58 57 56 55 54 53 52 51 50 49 48 47 46 45 44 43 42 41 40 39 38 37 36 35 34 33 32 |
|---|---|---|
| RRX | Mux Input |                                                                                  CI |
| ROR | Mux Input | 30 29 28 27 26 25 24 23 22 21 20 19 18 17 16 15 14 13 12 11 10 9 8 7 6 5 4 3 2 1 0 |
| LSR | Mux Input | F F F F F F F F F F F F F F F F F F F F F F F F F F F F F F F |
| ASR | Mux Input | 31 31 31 31 31 31 31 31 31 31 31 31 31 31 31 31 31 31 31 31 31 31 31 31 31 31 31 31 31 31 31 |
| LSL | Mux Input | 31 30 29 28 27 26 25 24 23 22 21 20 19 18 17 16 15 14 13 12 11 10 9 8 7 6 5 4 3 2 1 |
| REVSH | Mux Input |                                                                                  7 6 5 4 3 2 1 0 |
| RBIT | Mux Input |                                       8 9 10 11 12 13 14 15 0 1 2 3 4 5 6 7 |
| REV | Mux Input |                                       15 14 13 12 11 10 9 8 7 6 5 4 3 2 1 0 |
| REV16 | Mux Input |                       23 22 21 20 19 18 17 16                7 6 5 4 3 2 1 0 |

| Shift type | | Bit: 31 30 29 28 27 26 25 24 23 22 21 20 19 18 17 16 15 14 13 12 11 10 9 8 7 6 5 4 3 2 1 0 |
|---|---|---|
| RRX | Mux Input | 31 30 29 28 27 26 25 24 23 22 21 20 19 18 17 16 15 14 13 12 11 10 9 8 7 6 5 4 3 2 1 0 |
| ROR | Mux Input | 31 30 29 28 27 26 25 24 23 22 21 20 19 18 17 16 15 14 13 12 11 10 9 8 7 6 5 4 3 2 1 0 |
| LSR | Mux Input | 31 30 29 28 27 26 25 24 23 22 21 20 19 18 17 16 15 14 13 12 11 10 9 8 7 6 5 4 3 2 1 0 |
| ASR | Mux Input | 31 30 29 28 27 26 25 24 23 22 21 20 19 18 17 16 15 14 13 12 11 10 9 8 7 6 5 4 3 2 1 0 |
| LSL | Mux Input | 31 30 29 28 27 26 25 24 23 22 21 20 19 18 17 16 15 14 13 12 11 10 9 8 7 6 5 4 3 2 1 0 |
| REVSH | Mux Input | 0 F F F F F F F F F F F F F F F F F F F F F F F F F F F F F F F |
| RBIT | Mux Input | 7 7 7 7 7 7 7 7 15 14 13 12 11 10 9 8 |
| REV | Mux Input | 24 25 26 27 28 29 30 31 16 17 18 19 20 21 22 23 |
| REV | Mux Input | 31 30 29 28 27 26 25 24 23 22 21 20 19 18 17 16 |
| REV16 | Mux Input | 31 30 29 28 27 26 25 24                         15 14 13 12 11 10 9 8 |

FIG. 4

Funnel Shifter Bit Wiring (Level 2)
| Bit | 34 33 32 31 30 29 28 27 26 25 24 23 22 21 20 19 18 17 16 15 14 13 12 11 10 9 8 7 6 5 4 3 2 1 0 |
|---|---|
| Mux Input | 34 33 32 31 30 29 28 27 26 25 24 23 22 21 20 19 18 17 16 15 14 13 12 11 10 9 8 7 6 5 4 3 2 1 0 |
| Mux Input | 38 37 36 35 34 33 32 31 30 29 28 27 26 25 24 23 22 21 20 19 18 17 16 15 14 13 12 11 10 9 8 7 6 5 4 |
| Mux Input | 42 41 40 39 38 37 36 35 34 33 32 31 30 29 28 27 26 25 24 23 22 21 20 19 18 17 16 15 14 13 12 11 10 9 8 |
| Mux Input | 46 45 44 43 42 41 40 39 38 37 36 35 34 33 32 31 30 29 28 27 26 25 24 23 22 21 20 19 18 17 16 15 14 13 12 |
| Mux Input | 50 49 48 47 46 45 44 43 42 41 40 39 38 37 36 35 34 33 32 31 30 29 28 27 26 25 24 23 22 21 20 19 18 17 16 |
| Mux Input | 54 53 52 51 50 49 48 47 46 45 44 43 42 41 40 39 38 37 36 35 34 33 32 31 30 29 28 27 26 25 24 23 22 21 20 |
| Mux Input | 58 57 56 55 54 53 52 51 50 49 48 47 46 45 44 43 42 41 40 39 38 37 36 35 34 33 32 31 30 29 28 27 26 25 24 |
| Mux Input | 62 61 60 59 58 57 56 55 54 53 52 51 50 49 48 47 46 45 44 43 42 41 40 39 38 37 36 35 34 33 32 31 30 29 28 |
Funnel Shifter Bit Wiring (Level 3)
| Bit | 31 30 29 28 27 26 25 24 23 22 21 20 19 18 17 16 15 14 13 12 11 10 9 8 7 6 5 4 3 2 1 0 |
|---|---|
| Mux Input | 31 30 29 28 27 26 25 24 23 22 21 20 19 18 17 16 15 14 13 12 11 10 9 8 7 6 5 4 3 2 1 0 |
| Mux Input | 32 31 30 29 28 27 26 25 24 23 22 21 20 19 18 17 16 15 14 13 12 11 10 9 8 7 6 5 4 3 2 1 |
| Mux Input | 33 32 31 30 29 28 27 26 25 24 23 22 21 20 19 18 17 16 15 14 13 12 11 10 9 8 7 6 5 4 3 2 |
| Mux Input | 34 33 32 31 30 29 28 27 26 25 24 23 22 21 20 19 18 17 16 15 14 13 12 11 10 9 8 7 6 5 4 3 |
FIG. 5
ROR 3
| Bit | 38 37 36 35 34 33 32 31 30 29 28 27 26 25 24 23 22 21 20 19 18 17 16 15 14 13 12 11 10 9 8 7 6 5 4 3 2 1 0 |
|---|---|
| Lvl1 | 6 5 4 3 2 1 0 31 30 29 28 27 26 25 24 23 22 21 20 19 18 17 16 15 14 13 12 11 10 9 8 7 6 5 4 3 2 1 0 |
After right shifting 3, the 32 LSB is the final result
ASR 3
| Bit | 38 37 36 35 34 33 32 31 30 29 28 27 26 25 24 23 22 21 20 19 18 17 16 15 14 13 12 11 10 9 8 7 6 5 4 3 2 1 0 |
|---|---|
| Lvl1 | 31 31 31 31 31 30 29 28 27 26 25 24 23 22 21 20 19 18 17 16 15 14 13 12 11 10 9 8 7 6 5 4 3 2 1 0 |
After right shifting 3, the 32 LSB is the final result
FIG. 6

US 8,768,989 B2

FUNNEL SHIFTER IMPLEMENTATION

This patent application claims priority to Provisional Patent Application Ser. No. 61/454,274, filed Mar. 18, 2011, the content of which is herein incorporated by reference in its entirety.

BACKGROUND

1. Technical Field

This disclosure relates to shifter logic circuits, and more particularly to funnel shifters.

2. Description of the Related Art

Most processor designs use arithmetic logic units (ALUs) that implement some type of logical and/or arithmetic shifting circuit to perform various types of bitwise translation/manipulation of values. For example, simple power of two multiplication and division may be performed by shifting a binary value left or right, respectively. There are many types of general-purpose shifters. For example, a barrel shifter may rotate the value using a mask value to determine the type of shift. However, in some cases, some general-purpose shifters such as barrel shifters may not be fast enough for a given application.

SUMMARY OF THE EMBODIMENTS

Various embodiments of a funnel shifter are disclosed. In one embodiment, the funnel shifter includes an input, an output, and a multiplexer unit. The multiplexer unit may include a number of multiplexer levels. The multiplexer unit may be configured to perform one of a plurality of shift operations on the input value and to provide the output value in response to receiving a shift value and a shift operation value. A first multiplexer level may be configured to format and expand the input value into a larger intermediate value. At least a second multiplexer level may be configured to perform a linear shift of the intermediate value without wrapping any bits for creating the output value. At least some of the multiplexer levels may include multiplexer select signals that correspond to the shift values and the shift operation value. Each of the select signals may be represented as a plurality of N-Nary one of N signals where N is greater than or equal to two, wherein each of the plurality of N-Nary signals being implemented on a set of physical wires.

In another embodiment, a funnel shifter includes an input configured to receive an input value, an output configured to provide an output value, and a multiplexer unit coupled between the input and the output and including a plurality of multiplexer levels. The multiplexer unit may be configured to perform one of a number of shift operations on the input value and to provide the output value dependent upon received shift values and received shift operation values. In addition, the shift operations include bitwise logical shifts right and left, bitwise arithmetic shifts right and left, bitwise rotate left and right, and bit and byte order manipulation operations. The number of bits of shift may be determined for the bitwise operations by the received shift value.

BRIEF DESCRIPTION OF THE DRAWINGS

FIG. 3A is a block diagram of one embodiment of a generic N-Nary logic gate.

FIG. 3B is a diagram depicting an embodiment of a multiplexer implemented as a one of four NDL multiplexer having one of three selects.

FIG. 3C is a diagram depicting an embodiment of a multiplexer implemented as a one of one NDL multiplexer having one of three selects.

FIG. 4 is a diagram depicting an embodiment of the funnel shifter bit wiring for level 1 of the funnel shifter shown in FIG. 2.

FIG. 5 is a diagram depicting an embodiment of the level two and level three multiplexers of the funnel shifter shown in FIG. 2.

FIG. 6 is a diagram depicting an embodiment of a shift pattern for two representative shift types for the funnel shifter shown in FIG. 2.

Figure 1:
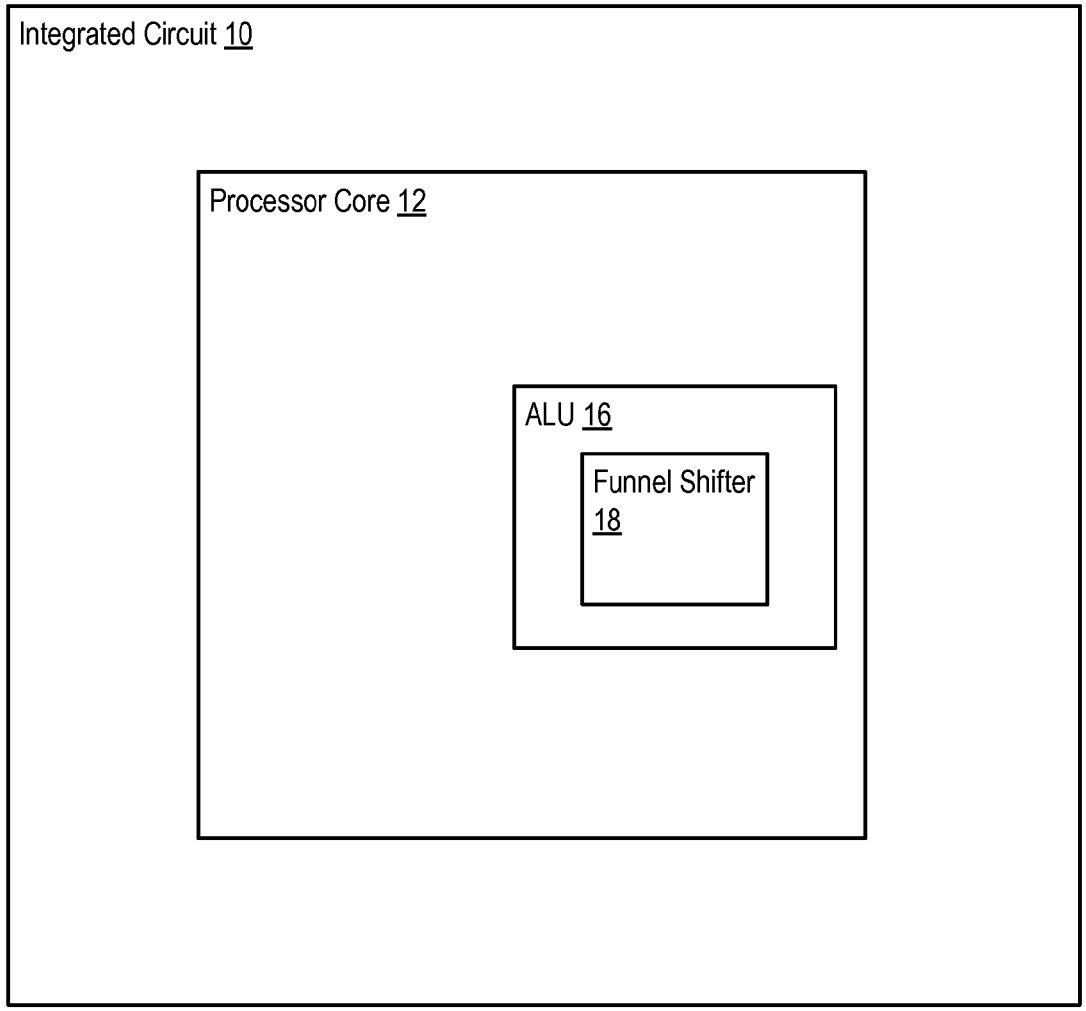
FIG. 1 is a block diagram of one embodiment of an integrated circuit including a funnel shifter.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a block diagram of one embodiment of an integrated circuit including a funnel shifter is shown.

The integrated circuit 10 includes a processor core 12 that includes an arithmetic logic unit 16, which in turn includes a funnel shifter 18. In one embodiment, the integrated circuit 10 may be considered as a system on a chip (SOC).

In various embodiments, during processing the arithmetic logic unit 16 may perform a variety of operations that require the use of funnel shifter 18 to perform various logical and/or arithmetic shift operations. Specifically, in one embodiment, the funnel shifter 18 may implement shift types including a rotate right with extend (RRX), rotate right (ROR), logical shift right (LSR), arithmetic shift right (ASR), logical shift left (LSL), reverse signed halfword (REVSH), reverse bits (RBIT), reverse byte (REV), and reverse halfword (REV16). In one embodiment, the RRX operation shifts a 32-bit value to the right one bit and shifts in the carry flag to bit 32. The REVSH operation reverses the byte order in the lower halfword of a 32-bit value and sign extends the result to 32 bits. The RBIT operation reverses the bit order of a 32-bit value. The REV operation reverses the byte order in a 32-bit value. The REV16 operation reverses the byte order in each 16-bit halfword of a 32-bit value. The LSR, LSL, ASR, and ROR may be considered to be bitwise shifts in which the number of bits is determined by a shift amount input. However, REVSH, RBIT, REV, and REV16 operations are considered to be bit and byte order manipulation operations.

In one embodiment, the funnel shifter 18 may be implemented using standard static logic, and in other embodiments the funnel shifter 18 may be implemented using N-nary logic, which is described in greater detail below in conjunction with the description of FIG. 3A through FIG. 3C.

Figure 2:
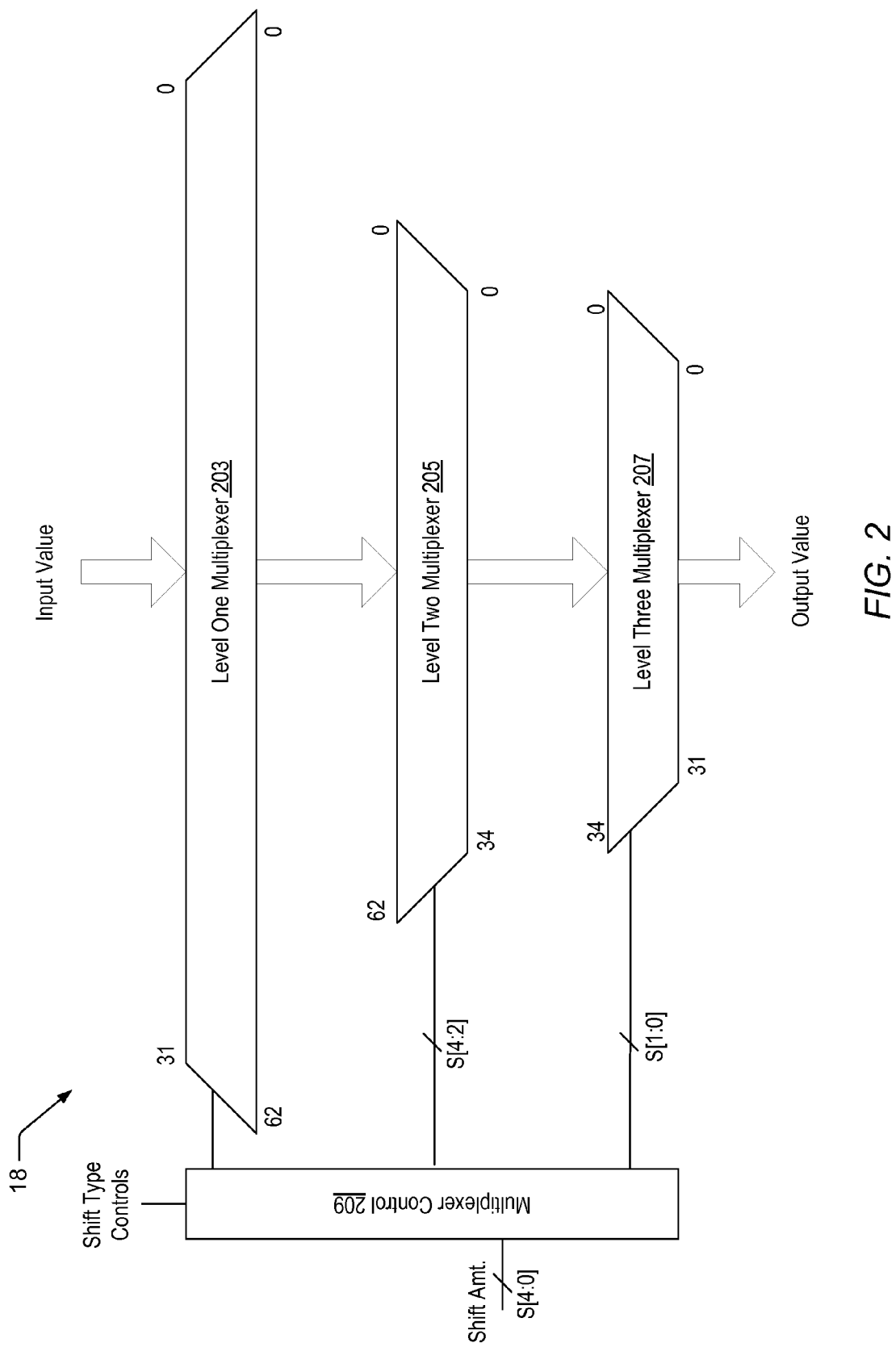
FIG. 2 is a block diagram of one embodiment of the funnel shifter of FIG. 1.

Referring to FIG. 2, a block diagram of one embodiment of the funnel shifter of FIG. 1 is shown. The funnel shifter 18 of FIG. 2 includes a level one mux 203, which is coupled to a level two mux 205, which is in turn coupled to a level three mux 207. The multiplexer control 209 is coupled to the level one through level three multiplexers and provides control signals based upon the type of shift and the number of bits to be shifted, for example.

As shown, the input value to the level one mux 203 is a 32-bit value. However the level one mux 203 takes the 32-bit input value and expands it to a 63-bit output value. Thus, the level one multiplexer 203 essentially formats the input value into the appropriate output value dependent on the type of shift being performed. The level two mux 205 has a 63-bit input and a 35-bit output, and the level three mux 207 has a 35-bit input and a 32-bit output. Thus as described in greater detail below, level two and level 3 multiplexers primarily do the shifting of the bits while the level one multiplexer 203 formats the input value so that the shifting done in the level two and level three multiplexers is independent of the type of shift, and is instead dependent on the number of bits to shift. As described further below in conjunction with the descriptions of FIG. 4 through FIG. 6, the translation of the bits (i.e., shifting) may occur through both formatting and shifting at the different levels of muxes.

As mentioned above, in one embodiment, the funnel shifter 18 may be implemented using N-nary logic. Generally speaking, N-nary logic, which is commonly referred to as N-nary dynamic logic or NDL, refers to a logic family which supports a variety of signal encodings that are of the 1 of N form where N may be any integer greater than one. A more common implementation of NDL uses 1 of 4 encodings, which uses four wires or signals to indicate one of four possible values.

In the N-nary design style, a 1 of 4 (or a 1 of N) signal corresponds to a bundle of wires kept together throughout the inter-cell route, which requires the assertion of no more than one wire either while precharging or evaluating. A traditional binary logic design in comparison would use only two wires to indicate four values by asserting neither, one, or both wires together. The number of additional wires represents one difference of the N-nary logic style, and on the surface makes it appear unacceptable for use in microprocessor designs. One of N signals are less information efficient than traditional signals because they require at least twice the number of wires, but N-nary signals have the advantage of including signal validation information, which is not possible with traditional signals. It is this additional information (the fact that when zero wires are asserted the result is not yet known) that indirectly allows us to eliminate P-channel logic and all of the series synchronization elements required in traditional designs.

Another advantage of the N-nary logic family is that N-nary signals include both true and false information, which means inverters are never required. This is important in two respects. First, a static design can no more avoid logical inversion than can N-nary logic. Although not obvious with any signal encoding other than 1 of 2 encoding, N-nary logic produces the logical inversion at each gate all the time. Static design often requires the inversion of signals, and so places inverters near the signal's destination.

Another advantage of the N-nary logic family is that it allows the designer to perform logic evaluations using a single type of transistor, for example, N-channel only logic or P-channel only logic. There may be several benefits to N-channel only evaluation gates relative to traditional static gates. The first is the elimination of P-channel devices on input signals, the second is the elimination of the need to build the complementary function in P-channel devices, and the third is the ability to share the N-channel evaluation "stack" among multiple outputs. Sharing portions of the evaluate "stack" among multiple outputs is not possible with static CMOS gates because it is not possible to obtain each output's function and complement from shared devices in both the P and N-channel stacks. Other dynamic logic families such as MODL, or Multiple Output Dynamic Logic, can produce multiple outputs by leveraging the fact that sub-functions are naturally available within dynamic evaluation stacks. The N-nary design style does not use sub-functions within evaluation stacks to produce multiple outputs. Instead, the N-nary design style uses separate evaluation stacks to directly produce the multiple outputs. The N-nary design style is similar to MODL in its ability to reduce transistor counts, but is superior in its ability to produce fast, power efficient circuits. When compared to static CMOS gates, the savings may be dramatic. FIG. 3A is a block diagram of one embodiment of a generic N-nary logic gate.

Referring to FIG. 3A, the N-nary logic gate 300 includes two input signals A and B, and an output signal C, which are all represented as 1 of 4 encodings. In the illustrated embodiment, logic gate 300 is a 2-bit logic gate, which means that the four wires carry two bits of information. More particularly, the A input is a 2-bit input, B is a 2-bit input, and C is a 2-bit output.

In the embodiment shown in FIG. 3A, logic gate 300 includes a logic tree circuit 303, a precharge circuit 301, and an evaluate circuit 305. Coupled to the logic tree circuit 303 is the 2-bit input signal A, which is a 1 of 4 signal that comprises a plurality of input values $A_0$, $A_1$, $A_2$, and $A_3$ and their associated wires or logic paths using a 1 of 4 encoding. Additionally coupled to the logic tree circuit is the 2 bit input B, which is another 1 of 4 signal that comprises a plurality of input values $B_0$, $B_1$, $B_2$, and $B_3$ and their associated wires or logic paths using a 1 of 4 encoding. In addition, coupled to the logic tree circuit 303 is the 2-bit output C, which is a 1 of 4 signal that comprises a plurality of output values $C_0$, $C_1$, $C_2$, and $C_3$ and their associated wires or logic paths using a 1 of 4 encoding. The logic tree circuit 303 performs a logic function on a plurality of input signals that could comprise a variety of functions, for example, the Boolean logic functions AND/NAND, OR/NOR, or XOR/Equivalence. The logic tree circuit 303 comprises one or more transistors, which in one embodiment comprise N-channel FETs, for example.

The precharge circuit 301 is coupled to the logic tree circuit 303 and precharges the dynamic logic of the logic tree circuit 303. The precharge circuit 301 may include one or more FETs, which in one embodiment may be P-channel FETs. Each evaluation path of the logic tree circuit 303 may have its own precharge P-FET. Coupled to the precharge circuit 301 is the clock signal CKA. A low clock signal on CKA will cause the FETs in the logic tree circuit 303 to charge when using P-channel FETs in the precharge tree circuit 301.

The evaluate circuit 305 is coupled to and controls the evaluation of the logic tree circuit 303. The evaluate circuit 305 may include one or more FETs, which in one embodiment may be a single N-channel FET. The CKA signal is also coupled to the evaluate circuit 305. A high clock signal on CKA will cause the FETs in the logic tree circuit 303 to evaluate when using N-channel FETs in the evaluate circuit.

An exemplary 3:1 mux implemented using a 1 of 4 or "quadenary" encoding is shown in FIG. 3B. The muxes shown in FIG. 2 may be implemented using N-nary logic because the muxes may be much faster than a similar mux implemented in standard cell logic particularly because of the width of the muxes that are implemented. This may be due in part to the use of predominantly N-channel transistors in the logic tree, and the logic tree in an N-nary logic mux may only require a two stack of N-channel devices, one for the data and one for the select. Thus, even though there may be additional wiring necessary for an N-nary logic implementation, the evaluation through the two stack is very fast in contrast to standard logic devices.

Referring to FIG. 3B, the mux 350 includes three inputs, A, B, and C and an output Z, where each of the inputs and outputs uses a quadenary (1 of 4) encoding and the selects use a one of three encoding. As shown, the select bits S0, S1, and S2 are on the bottom. Accordingly, only one of the 1 of 4 input signals will be selected by only one of the 1 of 3 selects and the appropriate output will be asserted. The other three data inputs are ignored, as are the other two selects. It is noted that the illustrated embodiment is but one implementation of a 3:1 quadenary logic mux and that other specific implementations are possible and contemplated.

Since the mux 350 is a quadenary logic mux, there are 4 signals for each input and output. The logic tree portion 353 includes an N-channel transistor for each of the data inputs A0-A3, B0-B3, and C0-C3. Likewise there is one N-channel transistor for each of selects S0-S3. Thus, the two-stack of N-channel transistors in the logic tree is quick to evaluate. In the illustrated embodiment, the evaluate portion 355 includes a single N-channel transistor that is coupled to circuit ground and to the CKA clock signal. However, the precharge portion 351 includes one P-Channel transistor for each of the output lines, and each is coupled to the CKA clock signal. The output stage 357 includes an inverter and a P-channel transistor for each output line. This configuration is referred to as a hold circuit, which holds the pre-charge value on the output until the logic tree evaluates to a logic zero.

An exemplary 3:1 mux implemented using a 1 of 1 encoding is shown in FIG. 3C. In one embodiment, the muxes shown in FIG. 2 may be implemented using this one of one logic because the muxes may be much faster than a similar mux implemented in standard cell logic for the reasons given above for the 1 of 4 mux.

Referring to FIG. 3C, the mux 370 includes three inputs, A, B, and C and an output Z, where each of the inputs and outputs uses a 1 of 1 encoding and the selects use a 1 of 3 encoding. As shown, the select bits S0, S1, and S2 are on the bottom. Accordingly, one of the input signals will be selected by only one of the 1 of 3 selects and provided to the output. The other two select inputs are ignored. It is noted that the illustrated embodiment is but one implementation of a 3:1 one of one logic mux and that other specific implementations are possible and contemplated.

Since the mux 370 is a 1 of 1 logic mux, there is one data signal for each input and output. The logic tree portion 373 includes an N-channel transistor for each of the data inputs A0, B0, and C0. Likewise there is one N-channel transistor for each of selects S0-S2. Thus, the two-stack of N-channel transistors in the logic tree is quick to evaluate. In the illustrated embodiment, the evaluate portion 375 includes a single N-channel transistor that is coupled to circuit ground and to the CKA clock signal, and the precharge portion 371 includes one P-Channel transistor for the output line, and it is coupled to the CKA clock signal. The output stage 377 includes an inverter and a P-channel transistor for the output line Z0. This configuration is referred to as a hold circuit, which holds the pre-charge value on the output until the logic tree evaluates to a logic zero.

As mentioned above, the different shifting types in the funnel shifter of FIG. 2 are provided through a combination of input bit formatting and routing and shift values. The formatting is illustrated in the level one mux wiring shown in FIG. 4.

Referring now to FIG. 4, a diagram depicting the bit wiring of the level one multiplexer of one embodiment of the funnel shifter of FIG. 2 is shown. The level one mux 203 expands a 32-bit input into a 63-bit output. In addition, depending one which shift type is selected, the level one mux 203 may use a different output format. As shown, the bits from the input are routed to different bit positions of the level one mux 203 dependent upon which shifting type is selected. The level one bit wiring shows nine mux input patterns for the 63-bit output value, dependent upon the operation. This represents the nine different combinations of formatting that are available at the level one mux 203, which corresponds to the nine different shift operations. Thus, the level one mux 203 may be thought of as having 63 muxes, some of which may be nine-to-one muxes. Some of the muxes have nine inputs, while some only have four. More particularly, if the shift type is RRX, for example, since there is no input for that operation, there are no active selects for that operation. Thus in one embodiment, the output bit 62 is driven to a logic zero. If the shift type is ROR, then the input bit 30 is coupled to the output bit 62. Similarly, output bit zero may be selected from one of input bit zero or forced to a logic value of one dependent upon which shift type is selected. Accordingly, each shift type may cause the output bits of the level one mux 203 to be coupled to a different grouping of input bits, and forced bits, or if there is no input and thus no active select for a given operation the mux output may be a logic zero. In addition, some of the inputs to a mux are duplicates and so additional inputs for the redundant inputs are unnecessary. For example, the level one mux output bit 62 has only four inputs, which may be selected from one of input bit 30, input bit 31, or forced to a logic value of one (designated as 'F') dependent upon which shift type is selected. In addition, because the input is the same (31) for the LSL and ASR operations, this is really a three input mux.

Turning to FIG. 5, a diagram depicting the bit wiring of the level two and level three multiplexers of one embodiment of the funnel shifter shown in FIG. 2 is shown. The level two bit wiring shows eight mux input patterns for the 35-bit output value, while the level three bit wiring shows four input patterns for the 32-bit output value. This represents the 8 different combinations of shifting that are available at the level two mux 205, and four different combinations of shifting that are available at the level three mux 207. Thus, the level two mux 205 may be thought of as having 35 eight-to-one muxes, and the level three mux 207 may be thought of as having 32 four-to-one muxes.

Referring back to FIG. 2, in one embodiment, the shift amount is a 5-bit value representing shift amounts of zero to 31. As shown, the three MSBs of the shift amount (e.g., S[4:2]) are routed to the level two mux 205, while the two LSBs of the shift amount (e.g., S[1:0]) are routed to the level three mux 207. Accordingly, the level two mux 205 may select from eight combinations and shift in increments of four bits, from zero to 28. Likewise, the level three mux 207 may select from four combinations and shift in increments of one bit, from zero to three.

Thus, referring back to FIG. 5, the level two mux wiring shows this shifting in increments of four. More particularly, for output bit 34, the input bits that are available for selection range from input bit 34 to input bit 62, in increments of four. The same is true for each output bit of the level two mux 205. In regard to the level three mux 207, there are four input patterns that are selectable. For example, for output bit 31 the input bits that are available for selection range from input bit 31 to input bit 34, in increments of one.

Referring to FIG. 6, a diagram depicting an exemplary shift pattern for two representative shift types for the funnel shifter shown in FIG. 2 is shown. More particularly, a shift pattern is shown for a 3-bit ROR and a 3-bit ASR. In the ROR3 example, 38 bits of the level one output from FIG. 4 are shown. Accordingly, if one were to shift this arrangement to the right three bits, the end result is the 32 LSBs. The result of such a 3-bit shift would be bit 2 would be in the output bit 31 bit position, bit 1 would be in the output bit 30 bit position, and so forth down to the output bit position 0, which would output bit 3.

Similarly for the ASR 3 shift example, 38 bits of the level one output from FIG. 4 are shown. Thus, if one were to shift this arrangement to the right three bits, the end result is the 32 LSBs. The result of such a 3-bit shift would be bit 31 would appear in output bit positions 31, 30, and 29, and bit 3 would be output from output bit position 0.

Figure 7:
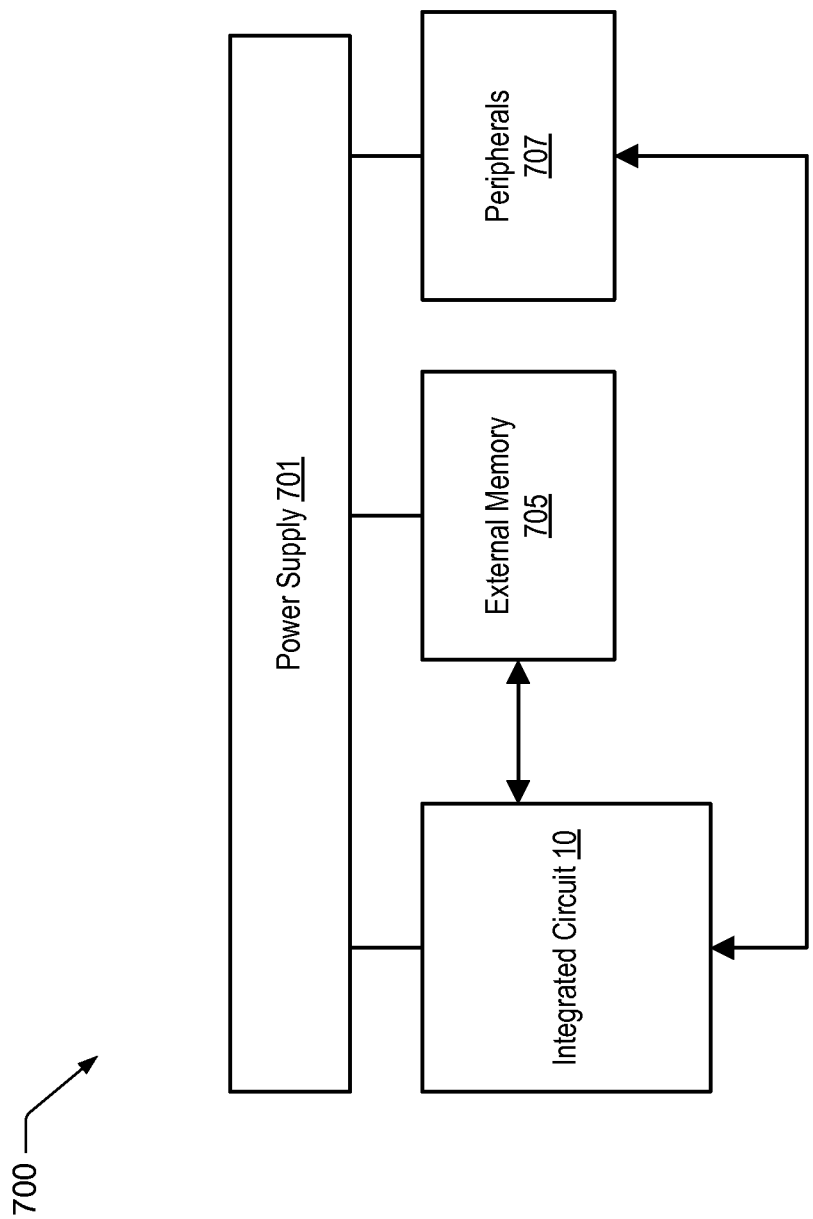
FIG. 7 is a block diagram of one embodiment of a system including the integrated circuit of FIG. 1.

Turning to FIG. 7, a block diagram of one embodiment of a system that includes the integrated circuit 10 is shown. The system 700 includes at least one instance of the integrated circuit 10 of FIG. 1 coupled to one or more peripherals 707 and an external system memory 705. The system 700 also includes a power supply 701 that may provide one or more supply voltages to the integrated circuit 10 as well as one or more supply voltages to the memory 705 and/or the peripherals 707. In some embodiments, more than one instance of the integrated circuit 10 may be included.

The peripherals 707 may include any desired circuitry, depending on the type of system. For example, in one embodiment, the system 700 may be included in a mobile device (e.g., personal digital assistant (PDA), smart phone, etc.) and the peripherals 707 may include devices for various types of wireless communication, such as WiFi, Bluetooth, cellular, global positioning system, etc. The peripherals 707 may also include additional storage, including RAM storage, solid-state storage, or disk storage. The peripherals 707 may include user interface devices such as a display screen, including touch display screens or multitouch display screens, keyboard or other input devices, microphones, speakers, etc. In other embodiments, the system 700 may be included in any type of computing system (e.g. desktop personal computer, laptop, workstation, net top etc.).

The external system memory 705 may include any type of memory. For example, the system memory 705 may be in the DRAM family such as synchronous DRAM (SDRAM), double data rate (DDR, DDR2, DDR3, etc.), or any low power version thereof. However, system memory 705 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A funnel shifter comprising:
   an input configured to receive an input value;
   an output configured to provide an output value; and
   a multiplexer unit coupled between the input and the output and including a plurality of multiplexer levels, wherein the multiplexer unit is configured to perform one of a plurality of shift operations on the input value and to provide the output value in response to receiving a plurality of shift values and a shift operation value;
   wherein a first level of the plurality of multiplexer levels is configured to format and expand the input value into a larger intermediate value; and
   wherein at least a second level of the plurality of multiplexer levels is configured to perform a linear shift of the intermediate value without wrapping any bits for creating the output value;
   wherein at least some of the plurality of multiplexer levels include multiplexer select signals that correspond to the plurality of shift values and the shift operation value, and wherein each of the select signals is represented as a plurality of N-Nary one of N signals where N is greater than or equal to two, wherein each of the plurality of N-Nary signals being implemented on a set of physical wires.

2. The funnel shifter as recited in claim 1, wherein a third level of the plurality of multiplexer levels is configured to perform a linear shift of a value provided by the second level without wrapping any bits to create the output value.

3. The funnel shifter as recited in claim 2, wherein the third level of the plurality of multiplexer levels includes a 35-bit input and a 32-bit output.

4. The funnel shifter as recited in claim 3, wherein the third level of the plurality of multiplexer levels comprises a plurality of four to one multiplexers.

5. The funnel shifter as recited in claim 1, wherein the first level of the plurality of multiplexer levels includes a 32-bit input and a 63-bit output.

6. The funnel shifter as recited in claim 5, wherein the first level of the plurality of multiplexer levels comprises a plurality of nine to one multiplexers.

7. The funnel shifter as recited in claim 1, wherein the second level of the plurality of multiplexer levels includes a 63-bit input and a 35-bit output.

8. The funnel shifter as recited in claim 7, wherein the second level of the plurality of multiplexer levels comprises a plurality of eight to one multiplexers.

9. The funnel shifter as recited in claim 1, wherein the multiplexer unit includes a control unit configured to provide the plurality of shift values and the plurality of shift operation values to the plurality of multiplexer levels in response to receiving shift amount values and the shift type values.

10. The funnel shifter as recited in claim 1, wherein the plurality of shift operations includes bitwise shift operations, and bit and byte order manipulation operations.

11. The funnel shifter as recited in claim 1, wherein each level of the plurality of multiplexer levels includes a plurality of multiplexers, wherein each of the multiplexers includes inputs and an output encoded as N-Nary one of N signals where N is greater than or equal to two.

12. A shifter comprising:
an input configured to receive an input value, wherein the input value is represented as a first plurality of N-Nary one of N signals where N is greater than or equal to two, each of the first plurality of N-Nary signals being implemented on a first set of physical wires;
an output configured to provide an output value, wherein the output value is represented as a second plurality of N-Nary one of N signals where N is greater than or equal to two, each of the second plurality of N-Nary signals being implemented on a second set of physical wires; and
a multiplexer unit including a plurality of multiplexer levels, wherein the multiplexer unit is configured to implement a funnel shifter, wherein the multiplexer unit is configured to perform one of a plurality of shift operations on the input value and to provide the output value dependent upon a received shift value and a received shift operation value.

13. The shifter as recited in claim 12, wherein the plurality of shift operations includes bitwise shift operations, and bit and byte order manipulation operations.

14. The shifter as recited in claim 12, wherein the multiplexer unit includes a control unit configured to provide the shift value and the shift operation value to the plurality of multiplexer levels in response to receiving a shift amount value and a shift type value.

15. The shifter as recited in claim 12, wherein each level of the plurality of multiplexer levels includes a plurality of multiplexers, wherein each of the multiplexers includes inputs and an output encoded as N-Nary one of N signals where N is greater than two.

16. The shifter as recited in claim 12, wherein a first level of the plurality of multiplexer levels is configured to format and expand the input value into a larger intermediate value based upon the received shift operation value.

17. The shifter as recited in claim 16, wherein for each of the plurality of shift operations the first level is configured to create a unique 63-bit combination of the input value.

18. The shifter as recited in claim 16, wherein a second level of the plurality of multiplexer levels is configured to shift the intermediate value a number of bits indicated by a partial number of bits of the shift value independent of the shift operation.

19. The shifter as recited in claim 16, wherein a third level of the plurality of multiplexer levels is configured to shift an output of the second level a number of bits indicated by a remaining number of bits of the shift value independent of the shift operation.

20. A funnel shifter comprising:
an input configured to receive an input value;
an output configured to provide an output value;
a multiplexer unit coupled between the input and the output and including a plurality of multiplexer levels, wherein the multiplexer unit is configured to perform one of a plurality of shift operations on the input value and to provide the output value dependent upon which of a plurality of shift values and a plurality of shift operation values are received;
wherein the plurality of shift operations includes bitwise logical shifts right and left, bitwise arithmetic shifts right and left, bitwise rotate left and right, and bit and byte order manipulation operations, wherein a number of bits of shift is determined for the bitwise operations by the received shift value.

21. The funnel shifter as recited in claim 20, wherein the multiplexer unit includes a control unit configured to provide the plurality of shift values and the plurality of shift operation values to the plurality of multiplexer levels in response to receiving shift amount values and the shift type values.

22. The funnel shifter as recited in claim 20, wherein each level of a plurality of multiplexer levels of the multiplexer unit includes a plurality of multiplexers, wherein each of the multiplexers includes select inputs encoded as N-Nary one of N signals, where N is greater than two.

23. An integrated circuit comprising:
a processor, wherein the processor includes one or more funnel shifters;
wherein each of the one or more funnel shifters includes:
an input configured to receive an input value;
an output configured to provide an output value; and
a multiplexer unit coupled between the input and the output and including a plurality of multiplexer levels, wherein the multiplexer unit is configured to perform one of a plurality of shift operations on the input value and to provide the output value in response to receiving a plurality of shift values and a shift operation value;
wherein a first level of the plurality of multiplexer levels is configured to format and expand the input value into a larger intermediate value; and
wherein at least a second level of the plurality of multiplexer levels is configured to perform a linear shift of the intermediate value without wrapping any bits for creating the output value;
wherein at least some of the plurality of multiplexer levels include multiplexer select signals that correspond to the plurality of shift values and the shift operation value, and wherein each of the select signals is represented as a plurality of N-Nary one of N signals where N is greater than or equal to two, wherein each of the plurality of N-Nary signals being implemented on a set of physical wires.

* * * * *